US008195400B2

(12) United States Patent
Wang

(10) Patent No.: US 8,195,400 B2
(45) Date of Patent: Jun. 5, 2012

(54) DIRECTIONAL RESISTIVITY IMAGING USING HARMONIC REPRESENTATIONS

(75) Inventor: Tsili Wang, Katy, TX (US)

(73) Assignee: Smith International, Inc., Houston, TX (US)

( * ) Notice: Subject to any disclaimer, the term of this patent is extended or adjusted under 35 U.S.C. 154(b) by 394 days.

(21) Appl. No.: 12/463,029

(22) Filed: May 8, 2009

(65) Prior Publication Data

US 2010/0286916 A1    Nov. 11, 2010

(51) Int. Cl.
*G01V 1/40* (2006.01)
*G01V 3/18* (2006.01)
*G01V 5/04* (2006.01)
*G01V 9/00* (2006.01)
*E21B 47/12* (2006.01)
*E21B 49/00* (2006.01)

(52) U.S. Cl. ............... 702/9; 702/6; 702/7; 73/152.03
(58) Field of Classification Search ............ 702/6, 7, 702/9; 73/152.03
See application file for complete search history.

(56) References Cited

U.S. PATENT DOCUMENTS

| | | |
|---|---|---|
| 4,562,556 A | 12/1985 | Ingram et al. |
| 4,642,648 A | 2/1987 | Hulland et al. |
| 5,023,450 A | 6/1991 | Gold |
| 5,045,795 A | 9/1991 | Gianzero et al. |
| 5,184,079 A | 2/1993 | Barber |
| 5,235,285 A | 8/1993 | Clark et al. |
| 5,339,036 A | 8/1994 | Clark et al. |
| 5,357,797 A | 10/1994 | Maki, Jr. et al. |
| 5,422,480 A | 6/1995 | Schultz |
| 5,461,562 A | 10/1995 | Tabanou et al. |
| 5,473,158 A | 12/1995 | Holenka et al. |
| 5,486,695 A | 1/1996 | Schultz et al. |
| 5,506,769 A | 4/1996 | Fu et al. |
| 5,513,528 A | 5/1996 | Holenka et al. |
| 5,591,967 A | 1/1997 | Moake |
| 5,672,867 A | 9/1997 | Gadeken et al. |
| 5,675,488 A | 10/1997 | McElhinney |
| 5,680,906 A | 10/1997 | Andrieux et al. |
| 5,899,958 A | 5/1999 | Dowell et al. |
| 5,966,013 A | 10/1999 | Hagiwara |
| 6,023,658 A | 2/2000 | Jeffryes |
| 6,131,694 A | 10/2000 | Robbins et al. |
| 6,307,199 B1 | 10/2001 | Edwards et al. |
| 6,321,456 B1 | 11/2001 | McElhinnney |
| 6,326,784 B1 | 12/2001 | Ganesan et al. |
| 6,476,609 B1 | 11/2002 | Bittar |

(Continued)

FOREIGN PATENT DOCUMENTS

EP    0084001 A2    7/1983

(Continued)

OTHER PUBLICATIONS

Oppenheim, A. V. and Schafer, R.W., "Digital Signal Processing", Prentice-Hall, 1975, pp. 239-250 and pp. 548-554.

(Continued)

*Primary Examiner* — Janet Suglo

(57) ABSTRACT

A method for making directional resistivity measurements and forming a directional resistivity image of a subterranean formation includes processing a plurality of directional resistivity measurements and corresponding azimuth angles to calculate a first order harmonic representation at selected azimuth angles. A two dimensional borehole image may be formed by repeating the procedure at multiple measured depths in the borehole.

24 Claims, 4 Drawing Sheets

U.S. PATENT DOCUMENTS

| | | |
|---|---|---|
| 6,509,738 B1 | 1/2003 | Minerbo et al. |
| 6,510,106 B2 | 1/2003 | Hudson |
| 6,584,837 B2 | 7/2003 | Kurkoski |
| 6,619,395 B2 | 9/2003 | Spross |
| 6,741,185 B2 | 5/2004 | Shi et al. |
| 6,911,824 B2 | 6/2005 | Bittar |
| 6,969,994 B2 | 11/2005 | Minerbo et al. |
| 7,019,528 B2 | 3/2006 | Bittar |
| 7,027,926 B2 | 4/2006 | Haugland |
| 7,057,392 B2 | 6/2006 | Wang et al. |
| 7,138,803 B2 | 11/2006 | Bittar |
| 7,202,670 B2 | 4/2007 | Omeragic et al. |
| 7,250,768 B2 | 7/2007 | Ritter et al. |
| 7,265,552 B2 | 9/2007 | Bittar |
| 7,375,530 B2 | 5/2008 | Chemali et al. |
| 7,382,135 B2 | 6/2008 | Li et al. |
| 7,414,405 B2 | 8/2008 | Moore |
| 7,414,407 B2 | 8/2008 | Wang et al. |
| 7,839,149 B2 * | 11/2010 | Wang et al. .................. 324/343 |
| 2004/0128073 A1 * | 7/2004 | Radtke et al. ..................... 702/8 |
| 2008/0290873 A1 | 11/2008 | Homan |
| 2008/0307875 A1 | 12/2008 | Hassan et al. |
| 2009/0015261 A1 | 1/2009 | Yang et al. |
| 2009/0030616 A1 | 1/2009 | Sugiura |

FOREIGN PATENT DOCUMENTS

| | | |
|---|---|---|
| EP | 0663511 A2 | 7/1995 |
| EP | 0981062 A2 | 2/2000 |
| EP | 0793000 | 4/2001 |
| GB | 2301438 | 4/1996 |
| GB | 2402489 A | 8/2004 |

OTHER PUBLICATIONS

International Search Report and Written Opinion dated Dec. 30, 2010 for corresponding PCT application No. PCT/US2010/033881 filed May 6, 2010.

* cited by examiner

DIRECTIONAL RESISTIVITY IMAGING USING HARMONIC REPRESENTATIONS

RELATED APPLICATIONS

None.

FIELD OF THE INVENTION

The present invention relates generally to a method for forming directional resistivity images of a subterranean borehole. More specifically, this invention relates to processing directional resistivity data to obtain first order harmonic representations at selected azimuth angles to form a directional resistivity image of the subterranean formation.

BACKGROUND OF THE INVENTION

The use of electrical measurements in prior art downhole applications, such as logging while drilling (LWD), measurement while drilling (MWD), and wireline logging applications is well known. Such techniques are commonly utilized to determine a subterranean formation resistivity, which, along with formation porosity measurements, may be used to indicate the presence of hydrocarbons in the formation. For example, it is known in the art that porous formations having a high electrical resistivity often contain hydrocarbons, such as crude oil, while porous formations having a low electrical resistivity are often water saturated. It will be appreciated that the terms resistivity and conductivity are often used interchangeably in the art. Those of ordinary skill in the art will readily recognize that these quantities are reciprocals and that one may be converted to the other via simple mathematical calculations. Mention of one or the other herein is for convenience of description, and is not intended in a limiting sense.

Directional resistivity measurements are also commonly utilized to provide information about remote geological features (e.g., remote beds and boundary layers) not intercepted by the measurement tool. In geosteering applications, directional resistivity measurements may be utilized in making steering decisions for subsequent drilling of the borehole. In order to make correct steering decisions, information about the strata, such as the dip and strike angles of the boundaries of the oil-bearing layer, and the relative location and orientation of the drill string in the strata is generally required. Directional resistivity measurements, and in particular borehole images derived from such measurements, are commonly utilized to estimate some or all of the above formation properties.

Downhole imaging tools are conventional in wireline applications. Such wireline tools typically create images by sending large quantities of azimuthally sensitive logging data uphole via a high-speed data link (e.g., a cable). Further, such wireline tools are typically stabilized and centralized in the borehole and include multiple (often times six or more) sensors extending outward from the tool into contact (or near contact) with the borehole wall. It will be appreciated by those of ordinary skill in the art that such wireline arrangements are not suitable for typical LWD applications. In particular, communication bandwidth with the surface would typically be insufficient during LWD operations to carry large amounts of image-related data. Further, LWD tools are generally not centralized or stabilized during operation and thus require more rugged sensor arrangements.

Several attempts have been made to develop LWD tools and methods that may be used to provide images of various azimuthally sensitive sensor measurements related to borehole and/or formation properties. Many such attempts have made use of the rotation (turning) of the BHA (and therefore the LWD sensors) during drilling of the borehole. For example, Holenka et al., in U.S. Pat. No. 5,473,158, discloses a method in which sensor data (e.g., neutron count rate) is grouped by quadrant about the circumference of the borehole. Likewise, Edwards et al., in U.S. Pat. No. 6,307,199, Kurkoski, in U.S. Pat. No. 6,584,837, and Spross, in U.S. Pat. No. 6,619,395, disclose similar methods. For example, Kurkoski discloses a method for obtaining a binned azimuthal density of the formation. In the disclosed method, gamma ray counts are grouped into azimuthal sectors (bins) typically covering 45 degrees in azimuth. Accordingly, a first sector may include data collected when the sensor is positioned at an azimuth in the range from about 0 to about 45 degrees, a second sector may include data collected when the sensor is positioned at an azimuth in the range from about 45 to about 90 degrees, and so on.

As described above, one problem with implementing LWD imaging techniques is that imaging techniques, in general, typically require large data storage and/or data transmission capacity. Due to the limited conventional communication bandwidth between a BRA and the surface, as well as limited conventional downhole data storage capacity, the sensor data used to form the images must typically undergo significant quantity reduction. Conventional techniques as described above accomplish such data quantity reduction via "binning" sensor data into a plurality of azimuthal sectors (also referred to as bins or azimuthal bins). While binning techniques have been utilized in commercial LWD applications, both real-time and memory LWD images are often coarse or grainy (and therefore of poor quality) and in need of improvement. For example, when the number of bins is small (e.g., quadrants or octants), conventional binning strongly distorts the high-frequency components of the data which results in aliasing. When the number of bins is large (e.g., 32 or more), there may not be enough data points for each bin to generate a stable (low noise) output. Conventional binning techniques may therefore not be an optimal approach to forming LWD images.

More recently, commonly assigned U.S. Pat. No. 7,027,926 to Haugland discloses a technique in which LWD sensor data is convolved with a one-dimensional window function. This approach advantageously provides for superior image resolution and noise rejection as compared with the previously described binning techniques and in particular reduces the aforementioned aliasing problem. Commonly assigned, co-pending U.S. Patent Publication 2009/0030616 (now U.S. Pat. No. 7,558,675) to Sugiura describes an image constructing technique in which sensor data is probabilistically distributed in either one or two dimensions (e.g., azimuth and measured depth). This approach also advantageously provides for superior image resolution and noise rejection as compared to prior art binning techniques. Moreover, it further conserves logging sensor data (i.e., the data is not over or under sampled during the probabilistic distribution) such that integration of the distributed data may also provide a non-azimuthally sensitive logging measurement. Notwithstanding the improvements disclosed in the '926 patent and the '043 publication, there remains room for further improvement of LWD imaging methods, in particular for directional resistivity imaging.

SUMMARY OF THE INVENTION

The present invention addresses one or more of the above-described drawbacks of prior art borehole imaging techniques. Aspects of this invention include a method for making directional resistivity measurements and forming a directional resistivity image of a subterranean formation. In one embodiment, directional resistivity measurements and corresponding azimuth angles are acquired during drilling while an LWD tool rotates in a borehole. The measurements are then processed to calculate a first order harmonic representation at each of a plurality of azimuth angles. The harmonic representations are typically saved in downhole memory and/or transmitted to the surface. A two dimensional borehole image may be formed by repeating the procedure at multiple measured depths in the borehole.

Exemplary embodiments of the present invention may advantageously provide several technical advantages. For example, the harmonic representation methodology of the present invention tends to provide a more accurate representation of the true directional resistivity signal (which is typically sinusoidal in azimuth) than does conventional binning. This is especially the case when a small number of azimuthal sectors (or bins) are utilized. As such, the invention tends to be advantageous in borehole imaging applications utilizing a small number of azimuthal sectors (such as applications in which the data (image) is transmitted to the surface in substantially real time during drilling).

Moreover, the present invention essentially stacks all of the available data points made at a particular measured depth (or in a predetermined time interval) in computing the first order harmonic representation for each azimuthal sector. The invention therefore tends to provide superior noise rejection as compared to prior art binning techniques. The invention further reduces signal noise by removing (mathematically filtering out) higher order harmonics (which are commonly related to signal noise).

In selecting only the first order harmonic, the harmonic representation method of the present invention further advantageously tends to reject DC bias. Such DC bias is commonly the result of drifting downhole electronics (e.g., due to temperature and pressure change during drilling). Rejection of the DC bias can be highly advantageous since the DC bias often severely distorts the pattern of a tool response and thus misleads interpretation of the response.

In one aspect the present invention includes a method for making a directional resistivity measurement. The method includes rotating a downhole directional resistivity tool in a borehole, the tool including at least one transmitting antenna, at least one axially spaced receiving antenna, and at least one azimuth sensor. The method further includes causing the tool to acquire a plurality of data pairs, each data pair comprising a directional resistivity measurement and a corresponding azimuth angle and processing the data pairs acquired in (b) to calculate a first order harmonic representation at a plurality of selected azimuth angles.

In another aspect, the invention includes a downhole measurement tool. The measurement tool includes a tool body having a longitudinal axis, at least one transmitting antenna deployed about the tool body, and at least one receiving antenna deployed about the tool body, the receiving antenna being axially spaced from the transmitting antenna. The downhole tool further includes a controller configured to (i) cause the tool to acquire a plurality of data pairs while rotating in a subterranean borehole, each data pair comprising a directional resistivity measurement and a corresponding azimuth angle; and (ii) process downhole the data pairs acquired in (i) to calculate a first order harmonic representation at a plurality of selected azimuth angles.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
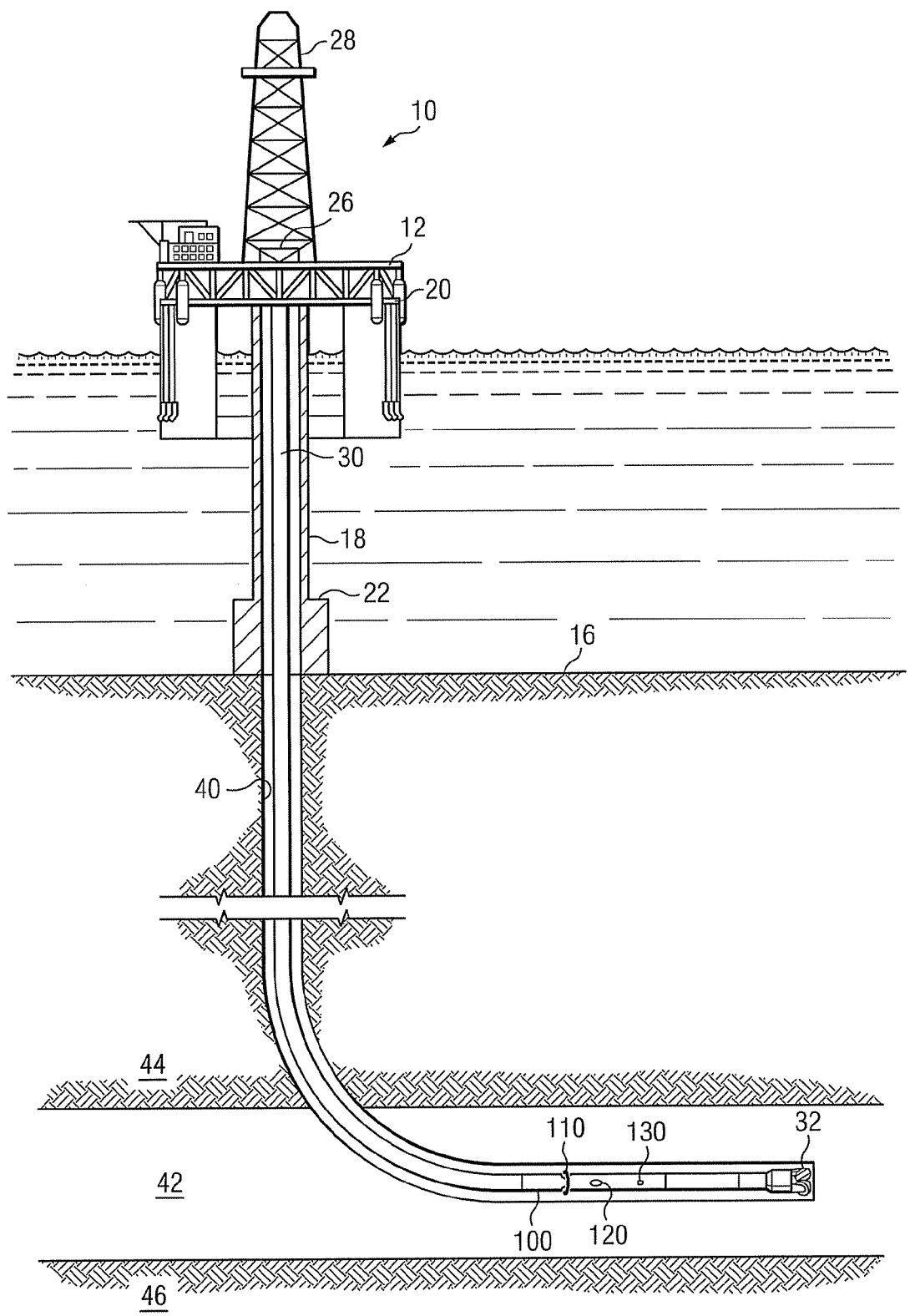
FIG. 1 depicts one exemplary LWD tool suitable for use in accordance with aspects of the present invention.

FIG. 1 schematically illustrates one exemplary embodiment of a logging while drilling directional resistivity tool 100 suitable for use with the present invention in an offshore oil or gas drilling assembly, generally denoted 10. In FIG. 1, a semisubmersible drilling platform 12 is positioned over an oil or gas formation (not shown) disposed below the sea floor 16. A subsea conduit 18 extends from deck 20 of platform 12 to a wellhead installation 22. The platform may include a derrick 26 and a hoisting apparatus 28 for raising and lowering the drill string 30, which, as shown, extends into borehole 40 and includes a drill bit 32 and LWD directional resistivity tool 100. Resistivity tool 100 typically includes at least one transmitting antenna 110 and at least one receiving antenna 120. The tool may further include an azimuth sensor 130 deployed thereon.

Azimuth sensor 130 (also referred to in the art as an orientation sensor) may include substantially any sensor that is sensitive to the rotational orientation of the tool 100 in the borehole, such as one or more accelerometers and/or magnetometers. For example, in one exemplary embodiment, a high frequency magnetic surveying device may be utilized, such as disclosed in commonly assigned U.S. Pat. No. 7,414,405. In the embodiment of FIG. 1, the azimuth sensor 130 is depicted on (or in) the resistivity tool. It will be appreciated that the invention is not limited in this regard as the azimuth sensor may be deployed substantially anywhere in the BHA.

It will be understood by those of ordinary skill in the art that the term "azimuth" as used herein refers to an angular measurement about the circumference of the tool 100. In particular, azimuth refers to the angular separation from a point of interest to a reference point. The azimuth is typically measured in the clockwise direction (although the invention is not limited in this regard), and the reference point is frequently the high side of the borehole or measurement tool, relative to the earth's gravitational field, or magnetic north. Another important label used in the borehole imaging context is the "toolface" angle. When a measurement tool is used to gather azimuthal imaging data, the point of the tool with the measuring sensor is identified as the "face" of the tool. The tool face angle, therefore, is defined as the angular separation about the circumference of the tool from a reference point to the radial direction of the toolface. In the remainder of this document, the terms azimuth and toolface will be used interchangeably, though the azimuth identifier will be used predominantly.

With continued reference to FIG. 1, the exemplary resistivity tool embodiment 100 depicted includes an axial transmitting antenna 110 axially offset from a transverse receiving antenna 120. This invention is not limited in this regards. Other suitable configurations are described below. As is known to those of ordinary skill in the art, a time varying electric current (an alternating current) in the transmitting antenna 110 produces a time varying magnetic field in the formation which in turn induces electrical currents (eddy currents) in the conductive formation. The eddy currents further produce secondary magnetic fields which may produce a voltage response in the receiving antenna 120. The measured voltage in the receiving antenna can be processed, as is know to those of ordinary skill in the art, to obtain a measurement of the secondary magnetic field, which may in turn be further processed to estimate formation resistivity and dielectric constant. These electrical formation properties can be further related to the hydrocarbon bearing potential of the formation.

Directional resistivity tools commonly measure or estimate a cross-component (e.g., the $H_{ZX}$ component) of the electromagnetic radiation as the tool rotates in the borehole (e.g., during drilling). FIG. 1 depicts an exemplary arrangement for obtaining the $H_{ZX}$ cross-component which is defined as the transverse reception (i.e., the x-mode reception) of an axially transmitted electromagnetic wave (a z-mode transmission). It will be appreciated that the invention is not limited to imaging the $H_{ZX}$ cross-component. On the contrary the invention may utilize substantially any component that exhibits suitable azimuthal sensitivity.

It is well known that the $H_{ZX}$ cross-component (as well as other azimuthally sensitive components) may be obtained using one or more conventional transverse receiving antennae (e.g., receiver 120 depicted on FIG. 1). For Example, U.S. Pat. Nos. 7,057,392 and 7,414,407 to Wang et al teach a method that employs an axial transmitter antenna and longitudinally spaced transverse receiving antennae. It is also well known that the $H_{ZX}$ cross-component (as well as other azimuthally sensitive components) may be obtained using one or more conventional tilted transmitting and or receiving antennae. For example, U.S. Pat. No. 6,181,138 to Hagiwara teaches a method that employs an axial transmitting antenna and three co-located, circumferentially offset tilted receiving antennae. U.S. Pat. Nos. 6,969,994 to Minerbo et al., 7,202, 670 to Omeragic et al., and 7,382,135 to Li et al teach a method that employs an axial transmitting antenna and two axially spaced tilted receiving antennae. The receiving antennae are further circumferentially offset from one another by an angle of 180 degrees. U.S. Pat. Nos. 6,476,609, 6,911,824, 7,019,528, 7,138,803, and 7,265,552 to Bittar teach a method that employs an axial transmitting antenna and two axially spaced tilted receiving antennae in which the tilted antennae are tilted in the same direction. It will be understood that downhole tools suitable for use with the present invention may therefore include one or more of either or both transverse transmitting and/or receiving antennae and/or tilted transmitting and/or receiving antennae. The present invention is expressly not limited these regards.

It will also be appreciated that the $H_{zx}$ cross-component (as well as other azimuthally sensitive components) may also be obtained using one or more non-planar antennae. Such non-planar antennae are disclosed in commonly invented, commonly assigned, and co-pending U.S. patent application Ser. No. 12/409,655 (now U.S. Patent Publication 2010/0244841), which is hereby fully incorporated by reference. A downhole tool suitable for use with the present invention may include one or more non-planar receiving antennae, e.g., configured for receiving transverse (x-mode) electromagnetic radiation. Moreover, the downhole tool may further include one or more non-planar transmitting antennae, e.g., configured for transmitting axial (z-mode) electromagnetic radiation. Again, the invention is expressly not limited in these regards.

In the development of subterranean reservoirs, it is common to drill boreholes at a predetermined distance from a bed boundary or a fluid contact within the reservoir. With continued reference to FIG. 1, directional resistivity measurements are commonly utilized to provide information about remote geological targets not intercepted by the measurement tool (e.g., the location of remote beds 44 and 46). Such information may include, for example, the distance and direction to the remote target. Directional resistivity measurements may also be utilized to provide information about the resistivity of the near-bed 42 (the bed in which tool 100 resides) and can be particularly useful, for example, in estimating the vertical and horizontal resistivity and dip angle of a near bed having anisotropic electrical properties.

Drill string 30 on FIG. 1 may include other downhole tools, for example, including a downhole drill motor, a mud pulse telemetry system for communicating with the surface, and other logging and/or measurement while drilling tools (such as surveying tools and other LWD tools), formation sampling tools, drill string steering tools, and the like. It will be understood by those of ordinary skill in the art that the present invention is not limited to use with a semisubmersible platform 12 as illustrated in FIG. 1. The present invention is equally well suited for use with any kind of subterranean drilling operation, either offshore or onshore. The invention is also well suited for certain wireline logging operations.

With continued reference to FIG. 1, directional resistivity tool 100 typically further includes a controller (not shown), e.g., having a programmable processor (not shown), such as a microprocessor or a microcontroller and processor-readable or computer-readable program code embodying logic. A suitable processor may be utilized, for example, to construct images (as described in more detail below with respect to FIGS. 2 and 3) of the subterranean formation based on directional resistivity measurements and associated azimuth and measured depth information. Images of the earth formation may indicate the physical properties of the formation and/or the location of a remote bed or boundary layer. A suitable controller may also optionally include other controllable components, such as sensors (e.g., a depth sensor), data storage devices, power supplies, timers, and the like. The controller may also be disposed to be in electronic communication with sensors 120 and 130. A suitable controller may also optionally communicate with other instruments in the drill string, such as, for example, telemetry systems that communicate with the surface. A typical controller may further optionally include volatile or non-volatile memory or a data storage device. Alternatively, the acquired raw sensor data (or pre-processed data) may be sent to the surface, for example, via a high-speed wired drill string and then processed in accordance with the present invention at the surface.

Figure 2:
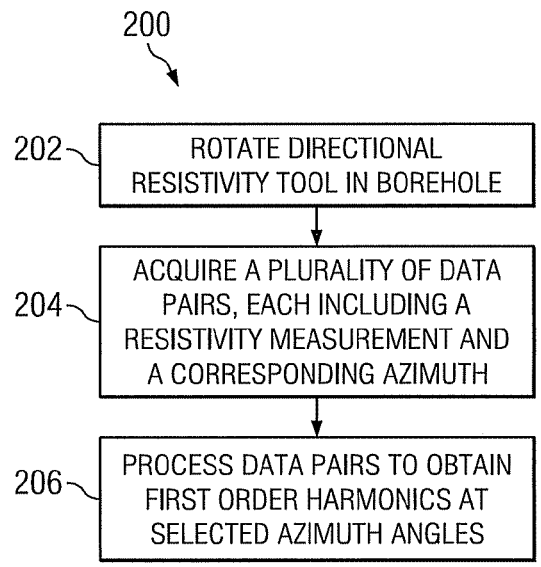
FIG. 2 depicts a flowchart of one exemplary method embodiment in accordance with the present invention.

Turning now to FIG. 2, one exemplary embodiment of a method 200 in accordance with the present invention is illustrated. A directional resistivity tool may be rotated in a borehole at 202 (e.g., via rotating drill string 30 in borehole 42 shown on FIG. 1). A plurality of data pairs are acquired at 204 as the tool rotates in the borehole. Each data pair includes a directional resistivity measurement and a corresponding azimuth angle. The plurality of data pairs may be acquired at substantially a single measured depth (or during a predetermined time interval) as the tool 100 rotates in the borehole. The directional resistivity measurements may include, for example, a cross-component of the secondary magnetic field in the formation. The corresponding azimuth measurements may include a tool face angle with respect to a particular direction (e.g., high side). The directional resistivity and corresponding azimuth measurements are commonly (although not necessarily) made during drilling and may be correlated at 204, for example, such that each data point in the sequence of directional resistivity data points is assigned an azimuth. The azimuth angle may be measured at substantially the same time as the directional resistivity measurement or interpolated, for example, from measurements made at other suitable times. The plurality of data pairs (directional resistivity measurements and corresponding azimuth measurements made at a single measured depth or in a predetermined time interval) are then processed at 206 to determine first order harmonics of the directional resistivity measurements at a plurality of predetermined azimuth angles. The processing in 206 is preferably performed downhole with the result being stored in downhole memory; however, the invention is not limited in this regard. As noted above, the raw data pairs acquired in 204 may alternatively be sent to the surface (e.g., via a high speed data link) then processed in 206 at the surface.

In general an image may be thought of as a two-dimensional representation of a parameter value determined at discrete positions. For the purposes of this disclosure, a resistivity image may be thought of as a two-dimensional representation of an electrical measurement (e.g., an induced voltage measurement at the receiver, an induced secondary magnetic field in the formation, or a resistivity or a dielectric constant of the formation) at discrete azimuths and borehole depths. Such images thus convey the dependence of the electrical measurement on the borehole azimuth and depth. It will therefore be appreciated that one purpose in forming such images is to determine the actual azimuthal dependence of the electrical measurement (and the corresponding formation properties) as a function of the borehole depth. Determination of the actual azimuthal dependence may enable a value of the formation parameter to be determined at substantially any arbitrary azimuth, for example via interpolation. The extent to which a measured image differs from the true azimuthal dependence may be thought of as image distortion. Such distortion may be related, for example, to statistical measurement noise and/or other effects, such as aliasing and bias. Notwithstanding, minimizing image distortion advantageously improves the usefulness of borehole images in determining the actual azimuthal dependence of the borehole parameters.

In order to minimize the above-described image distortion, formation data is typically accumulated for a predetermined number of drill string rotations, for a predetermined time (e.g., 10 seconds), or until a predetermined number of measurements have been made (e.g., 1000) at each discrete measured depth. In one exemplary serviceable embodiment of this invention, an electromagnetic wave may be transmitted substantially continuously over some predetermined time interval (e.g., for about 10 seconds) as the directional resistivity tool rotates in the borehole (i.e., an AC electrical current is continuously passed through a transmitting antenna such that it continuously transmits electromagnetic waves). The induced voltage at an axially spaced receiving antenna may then be measured at some predetermined frequency (e.g., at about 10 millisecond intervals). This measurement interval is preferably significantly less than the period of the tool rotation in the borehole (e.g., the measurement interval may be about 10 milliseconds or less while the rotational period of the tool may be about 0.5 seconds). Meanwhile, the azimuth sensor measures the azimuth angle of the tool, and correspondingly the moment of the receiving or transmitting antennae, as the tool rotates in the borehole. An azimuth angle may then be assigned to each voltage measurement (i.e., to each measurement interval). The azimuth angle is preferably measured at each measurement interval, or often enough so that it may be determined (e.g., via interpolation) for each measurement interval, although the invention is not limited in this regard. It will thus be understood that each data pair typically includes a directional resistivity measurement (e.g., a voltage measurement from which the various other parameters may be calculated) and a corresponding azimuth measurement (a toolface angle).

The predetermined time interval during which the electromagnetic wave is transmitted is typically significantly longer than both the above described measurement interval and the rotational period of the tool (e.g., the time interval may be 10 seconds, which is 1000 times longer than a 10 millisecond measurement interval and 20 times longer than a 0.5 second rotational period of the tool). The data acquired during a single time period (e.g., within the 10 second interval) typically represents a single "trace" of sensor data, i.e., a measurement at a single measured depth in the borehole. It will be appreciated that the invention is not limited to any particular time and/or measurement intervals. Nor is the invention limited to any particular number of data pairs per measured depth, although, it is typically advantageous to utilize 100 or more data pairs per measured depth so as to appropriately reduce measurement noise.

To form a two-dimensional image, it will be understood that measurements at multiple measured depths are required. Such measurements may be acquired, for example, during consecutive and/or sequential time periods (although the invention is not limited in this regard). For example, measurements made during a first 10 second time interval may be tagged with a first measured depth, while measurements made during a second 10 second time interval may be tagged with a second measured depth.

It will also be understood that the invention is not limited to embodiments in which a single transmitting antenna is fired and a voltage response measured at a single receiving antenna. Substantially any number of transmitting antennae and receiving antennae may be utilized. For example, voltage measurements may be made simultaneously at a plurality of axially spaced receiving antennae. Moreover, multiple transmitting antennae may be fired during sequential time periods. The invention is not limited in any of these regards.

With continued reference to FIG. 2, any discrete data pair (a directional resistivity measurement and corresponding azimuth measurement) can be represented as a summation of its harmonics. This may be represented mathematically, for example, as follows:

$$d(\phi) = d_i \delta(\phi - \phi_i) = d_i \sum_{n=-\infty}^{\infty} \cos[n(\phi - \phi_i)] \qquad \text{Equation 1}$$

where $d(\phi)$ represents the harmonic representation of the discrete measurement, $\phi \in [0,360]$ represents the tool azimuth angle, $d_i$ represents the i-th measurement, $\phi_i$ represents the corresponding azimuth angle associated with the i-th measurement such that $d_i$ and $\phi_i$ in combination represent a data pair, $\delta$ represents the delta function, and n represents the harmonic order.

In the above described method 200, a plurality of directional resistivity measurements are made at a corresponding plurality of azimuth angles. Equation 1 may be generalized to include a plurality of data pairs, for example, as follows:

$$d(\phi) = \sum_i d_i \delta(\phi - \phi_i) = \sum_i d_i \sum_{n=-\infty}^{\infty} \cos[n(\phi - \phi_i)] \quad \text{Equation 2}$$

where $$\sum_i (\cdot)$$

indicates that all of the measurements taken at a single measured depth (or within a predetermined time interval) are summed. Thus, each of the data pairs (each directional resistivity measurement and its corresponding azimuth angle) contributes to any discrete representation $d(\phi)$.

Generally speaking, an LWD directional resistivity response as a function of azimuth angle (tool face) tends to be a single period of a sine wave having zero mean value. For example, a remote bed boundary (e.g., as depicted on FIG. 1) or a liquid-liquid contact tends to produce such a directional resistivity response. An anisotropic near-bed also tends to produce a directional resistivity response as a function azimuth angle that is a single period of a sine wave having zero mean value. Such a response may often be best represented by a first-order harmonic representation of the measured data pairs. The lowest order (often referred to as the zeroth-order) harmonic corresponds to the D.C. component. The first-order harmonics is a sine wave, and so on.

A first order harmonic representation may be represented mathematically, for example, as follows:

$$d(\phi) = \sum_i d_i \delta(\phi - \phi_i) = \sum_i d_i \cos(\phi - \phi_i) \quad \text{Equation 3}$$

Equation 3 constructs a continuous function of the directional resistivity response with respect to the tool azimuth angle by summing a set of discrete data pairs (i.e., discrete directional resistivity measurements at corresponding known azimuth angles). Based on Equation 3, a discrete directional resistivity tool response $d(\phi)$ may be calculated at any selected azimuth angle $\phi$ (or at any regularly or irregularly spaced set of selected azimuth angles) by computing a sum of the first order harmonic component of each measurement (a sum of each data pair's first order harmonic).

The azimuthal dependence of the tool response may be estimated by calculating the tool response at multiple (regularly or irregularly) spaced azimuth angles. For example, the tool response may be calculated at 16 equally spaced azimuth angles resulting in a data set having 16 "harmonic bins." This may be expressed mathematically, for example, as follows:

$$d(\phi_k) = \sum_i d_i \cos(\phi_k - \phi_i), k = 1, 2, \ldots, 16 \quad \text{Equation 4}$$

where $d(\phi_k)$ represents the first order harmonic representation at the azimuth angles $\phi_k$. In this example, the sum of the first order harmonic components is computed at each of the azimuth angles $\phi_k$. It will be understood that $d(\phi_k)$ may be thought of as a single trace of a directional resistivity image, representing the azimuthal dependence of the tool response (e.g., the measured voltage) as a function of azimuth angle at a single measured depth. It will be appreciated that substantially any number of harmonic bins may be utilized. Thus, Equation 4 may be expressed in a more general sense such that $k=1, 2, \ldots, m$ where m is an integer. In preferred embodiments of the invention, m is in the range from about four to about 64 depending upon the degree of image compression and accuracy desired; however, the invention is in no way limited in this regard. It will be understood that the azimuth angles $\phi_k$ may be preselected (e.g., relative to high side) prior to execution of the inventive method. Alternatively, the azimuth angles $\phi_k$ may be selected during execution of the method, for example, based on geological parameters (the location of a bed boundary) or based on an analysis of the data pairs or previously processed harmonic representations). The invention is not limited in these regards.

Figure 3A:
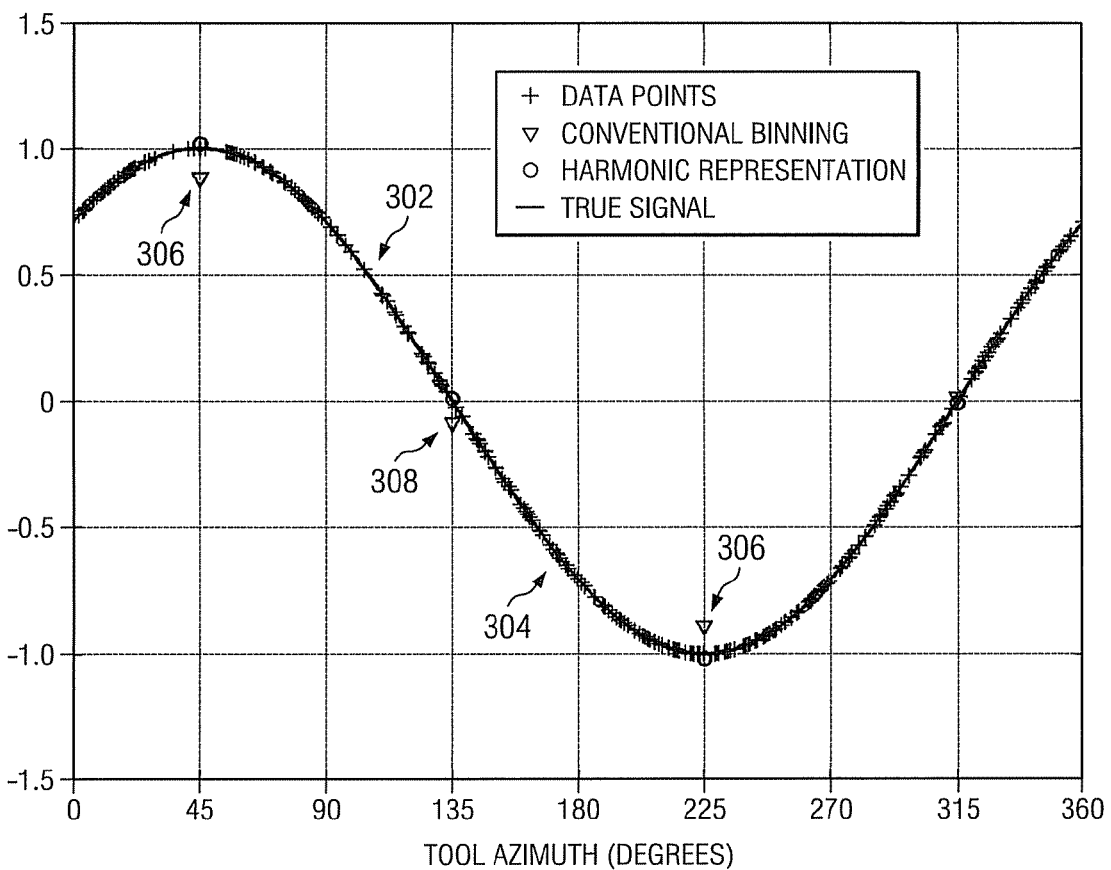
FIGS. 3A through 3C depict comparative examples in which the present invention is contrasted with conventional binning.
Figure 3B:
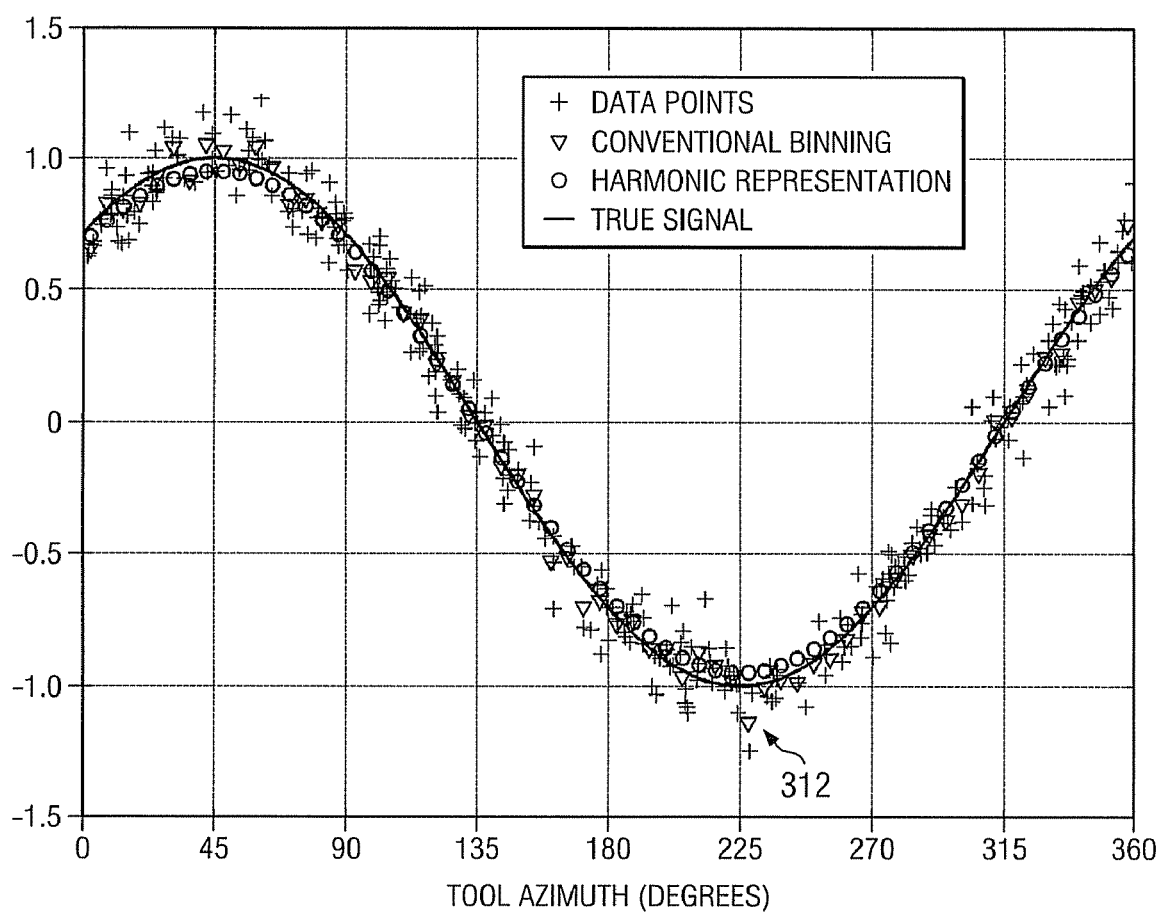
Figure 3C:
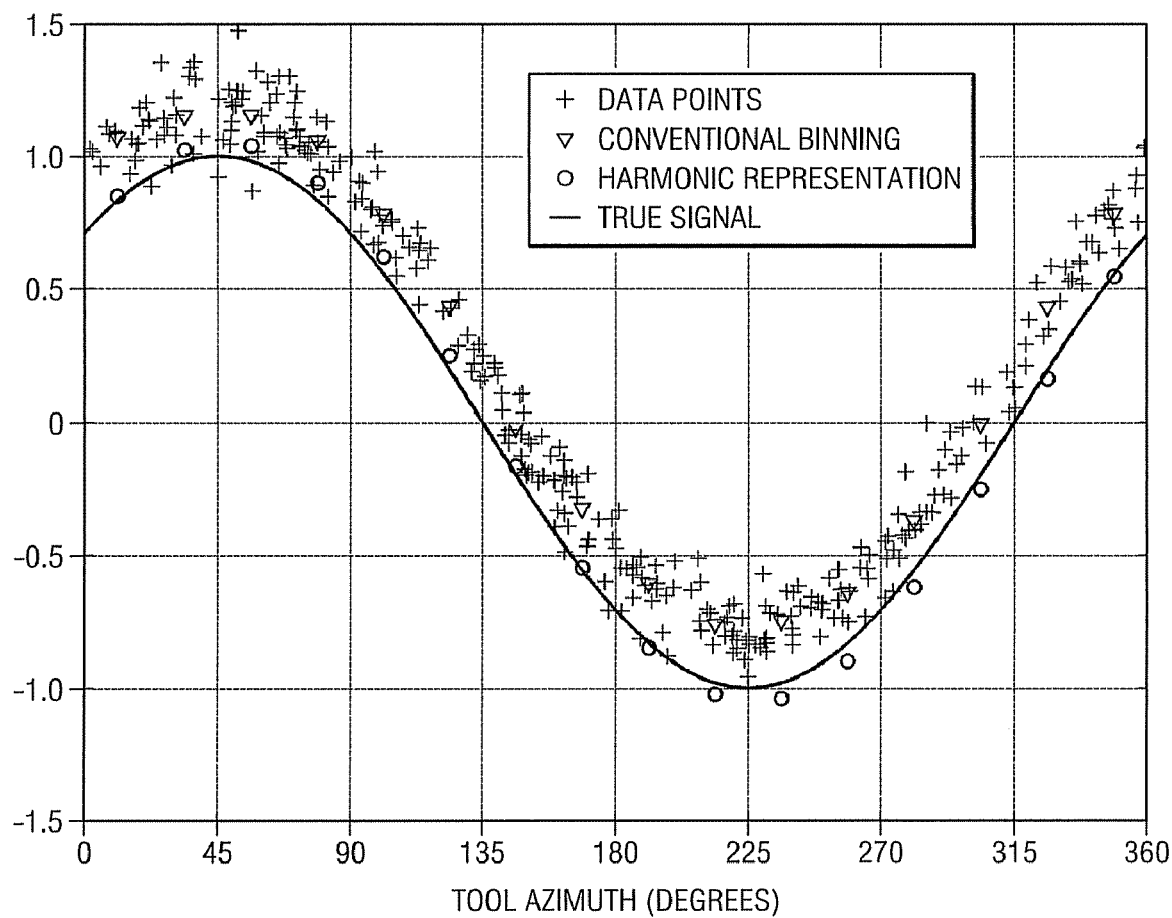

Certain advantages of the invention are now described in more detail with respect to FIG. 3A through 3C (collectively FIG. 3). FIG. 3A compares the present invention with conventional binning for an embodiment in which a small number (four) of bins is utilized. In this example, the "true" signal is represented by a sine wave having a maximum value at an azimuth angle of 45 degrees and a minimum value at 225 degrees. The directional resistivity measurements are represented by a 320 data pairs randomly distributed in azimuth along the sine wave. Each data pair is represented by the "+" symbol and lies on the sine wave as depicted.

As can be seen, the harmonic representation method of the present invention provides a more accurate representation of the true signal (the sine wave) than does conventional binning when a small number of azimuthal segments are created. The first order harmonic representation for each sector (as represented by the "o" symbol) can be seen to lie on the sine wave indicating a highly accurate representation of the true signal. As such, the present invention enables a high degree of data compression to be achieved without significant degradation in data accuracy. In contrast, when a small number of bins are created, the conventional binning methodology introduces at least two sources of error (the conventionally binned data points are represented by the "∇" symbol). First, as shown at 306, the peak values of the sine wave (at the maximum and minimum) tend to be systematically underestimated due to the small number of bins (and the nonlinearity of the true signal with azimuth angle). Second, errors can be introduced due to the random distribution of the data pairs in azimuth. In the example shown, certain azimuthal regions (e.g., 302) have a lower density of data pairs than other azimuthal regions (e.g., 304). This can result in an offset of the binned value from the true signal as indicated at 308.

One further advantage of the present invention is highlighted by FIG. 3A. It will be appreciated that the true signal (the sine wave) may be accurately represented by a relatively small number of azimuthal sectors (e.g., four sectors as shown on FIG. 3A). As a result, the directional resistivity images may be highly compressed such that they may be transmitted to the surface in substantially real time during drilling using conventional telemetry techniques (e.g., conventional mud pulse telemetry). Due to the accuracy and robustness of the harmonic representation method of the present invention, this may be accomplished with minimal image distortion. At the surface, the received data points (e.g., the four points shown on FIG. 3A) may then be fit with a sine wave to enable azimuthal interpolation. Moreover, transmission of the data trace by trace (i.e., one measured depth at a time) tends to advantageously result in a low latency transmission of the image to the surface.

FIG. 3B depicts an example in which 64 regularly spaced azimuthal sectors (or bins) are created. The directional resistivity measurements are again represented by 320 data pairs randomly distributed in azimuth. In this example, the data pairs (which are represented by the "+" symbol) further include a 10% Gaussian noise distribution in the measured signal at any azimuth. Once again, the harmonic representation method of the present invention provides a more accurate representation of the true sine wave than does conventional binning, with the harmonic representation for each of the 64 azimuthal sectors (as represented by the "o" symbol) lying on the true signal (the sine wave). The conventional binning methodology, on the other hand, does not significantly reduce the original noise. The present invention provides superior noise rejection since it essentially stacks all of the available data points (all 320 data pairs) in computing a value at any particular azimuthal sector. Conventional binning merely averages the data points in any particular bin (any particular azimuthal window). When a large number of bins are created, there tends to be relative few data pairs per bin (an average of five per bin in the example of FIG. 3B). As a result, conventional binning provides minimal noise reduction (as indicated by the "∇" symbol). The retained noise can be significant as indicated at 312 for bins having relatively few data pairs.

FIG. 3C depicts an example in which 16 regularly spaced azimuthal sectors (or bins) are created. The directional resistivity measurements are again represented by 320 data pairs randomly distributed in azimuth. The data pairs also include a 10% Gaussian noise distribution as describe above. In the FIG. 3C example, the data pairs further include a 10% DC bias added to the true signal. The data pairs are again represented by the "+" symbol. As is known to those of ordinary skill in the art, DC bias is sometimes caused, for example, by a drift in the LWD electronics. Certain borehole environmental effects can also cause a DC bias. As depicted (and indicated by the "∇" symbol), conventional binning retains the DC bias. The harmonic representation method of the present invention, however, advantageously selects only the first order harmonic and therefore rejects DC bias (the zeroth order) and other higher order harmonics (the noise). This is clearly demonstrated in FIG. 3C by the harmonic representations (indicated by the "o" symbol) which again all lie on (or very near) the true signal (the sine wave).

It will be appreciated that the harmonic representation method of the present invention is not a data fitting methodology. One example of a data fitting (or curve fitting) method known in the art is U.S. Pat. No. 7,382,135 to Li, et al. Such data fitting (curve fitting) techniques retain DC bias. The present invention advantageously removes DC bias (as shown above in FIG. 3C) by mathematically removing (filtering out) the zeroth order component (the DC bias component) of the data. The present invention further removes noise by mathematically removing (filtering out) the higher order (the second order, third order, fourth order, and so on) components of the data as shown above with respect to FIG. 3B.

As described above, the harmonic representations are typically stored to downhole memory and/or transmitted to the surface. In one advantageous embodiment of the invention, first order harmonic representations may be computed at a relatively large number of azimuth angles (e.g., 16 or more) and saved to downhole memory. A selected few of the representations (e.g., 4) may also be transmitted to the surface in substantially real-time during drilling. The invention is, of course, not limited in these regards.

It will be appreciated that in order to form a two-dimensional image (azimuthal position versus well depth), sensor data may be acquired at a plurality of well depths using the procedure described above. In one exemplary embodiment, sensor data may be acquired substantially continuously during at least a portion of a drilling operation. Sensor data may be grouped by time (e.g., in 10 second intervals) with each group indicative of a single well depth. The data pairs in each group may then be processed in accordance with the invention as described above. As also described in the above exemplary embodiment, each data pair may be acquired in about 10 milliseconds. Such data pairs may be grouped in about 10 second intervals resulting in about 1000 measurements per group (or per measured depth). At a drilling rate of about 60 feet per hour, each group represents about a two-inch depth interval. It will be appreciated that this invention is not limited to any particular measurement and/or time intervals. Nor is this invention limited by the description of the above exemplary embodiments.

It will also be appreciated that embodiments of this invention may be utilized in combination with substantially any other known methods for correlating the above described time dependent sensor data with depth values of a borehole. For example, the harmonic representations obtained in Equation 4 may be tagged with a depth value using known techniques used to tag other LWD data. The tagged data may then be plotted as a function of azimuthal position and depth to generate an image.

It will be understood that the aspects and features of the present invention may be embodied as logic that may be processed downhole using a microprocessor, hardware, firmware, programmable circuitry, or any other processing devices and methodologies known in the art. Similarly the logic may be embodied on software suitable to be executed by a downhole processor, as is also well known in the art. The invention is not limited in this regard. The software, firmware, and/or processing device may be included, for example, on a downhole assembly in the form of a circuit board, on board a sensor sub, or MWD/LWD sub. Electronic information such as logic, software, or measured or processed data may be stored in memory (volatile or non-volatile), or on conventional electronic data storage devices such as are well known in the art.

Although the present invention and its advantages have been described in detail, it should be understood that various changes, substitutions and alternations can be made herein without departing from the spirit and scope of the invention as defined by the appended claims.

I claim:

1. A method for making a downhole directional resistivity measurement, the method comprising:
   (a) rotating a downhole directional resistivity tool in a borehole, the tool including at least one transmitting antenna, at least one axially spaced receiving antenna, and at least one azimuth sensor;
   (b) causing the tool to acquire a plurality of data pairs, each data pair comprising a directional resistivity measurement and a corresponding azimuth angle;

(c) processing a summation of the data pairs acquired in (b) to calculate a first order harmonic representation at a plurality of selected azimuth angles.

2. The method of claim 1, wherein the processing in (c) is performed downhole.

3. The method of claim 1, wherein (b) comprises causing the tool to acquire at least 100 data pairs.

4. The method of claim 1, wherein the plurality of selected azimuth angles in (c) comprises from 4 to 64 azimuth angles.

5. The method of claim 1, wherein each of the data pairs acquired in (b) contributes to each of the first order harmonic representations calculated in (c).

6. The method of claim 1, wherein the processing in (c) comprises computing a sum of a first order harmonic component of each of the data pairs at each of the selected azimuth angles.

7. The method of claim 1, wherein the first order harmonic representations are calculated in (c) according to the following mathematical equation:

$$d(\phi_k) = \sum_i d_i \cos(\phi_k - \phi_i), k = 1, 2, \ldots, m$$

wherein $d(\phi_k)$ represent the first order harmonic representations at the selected azimuth angles $\phi_k$, $d_i$ represents the directional resistivity measurement in the i-th data pair and $\phi_i$ represents the corresponding azimuth angle in the i-th data pair such that $d_i$ and $\phi_i$ in combination represent the plurality of data pairs, and m is an integer.

8. The method of claim 1, further comprising:
(d) storing the first order harmonic representations calculated in (c) in downhole memory.

9. The method of claim 1, further comprising:
(d) transmitting selected ones of the first order harmonic representations calculated in (c) to the surface.

10. The method of claim 1, further comprising:
(d) repeating (b) and (c) at a plurality of distinct measured depths in the borehole.

11. The method of claim 1, wherein the directional resistivity tool acquires the plurality of data pairs in (b) during rotation of the tool in (a).

12. A method for making a downhole directional resistivity measurement, the method comprising:
(a) rotating a downhole directional resistivity tool at a first longitudinal position in a borehole, the tool including at least one transmitting antenna, at least one axially spaced receiving antenna, and at least one azimuth sensor;
(b) causing the tool to acquire a plurality of data pairs, each data pair comprising a directional resistivity measurement and a corresponding azimuth angle;
(c) processing a summation of the data pairs acquired in (b) to calculate a first order harmonic representation at a plurality of selected azimuth angles;
(d) repositioning the downhole tool and rotating it at a second longitudinal position in the borehole and repeating (b) and (c).

13. The method of claim 12, wherein the processing in (c) is performed downhole.

14. The method of claim 12, further comprising:
(e) assigning a first measured depth value to the first order harmonic representations calculated in (c) and a second measured depth value to the first order harmonic representations calculated in (d).

15. The method of claim 12, wherein the processing in (c) and (d) comprises computing a sum of the first order harmonic components of each of the data pairs at each of the selected azimuth angles.

16. The method of claim 12, wherein the first order harmonic representations are calculated in (c) and (d) according to the following mathematical equation:

$$d(\phi_k) = \sum_i d_i \cos(\phi_k - \phi_i), k = 1, 2, \ldots, m$$

wherein $d(\phi_k)$ represent the first order harmonic representations at the selected azimuth angles $\phi_k$, $d_i$ represents the directional resistivity measurement in the i-th data pair and $\phi_i$ represents the corresponding azimuth angle in the i-th data pair such that $d_i$ and $\phi_k$ in combination represent the plurality of data pairs, and m is an integer.

17. The method of claim 12, further comprising:
(e) storing the first order harmonic representations calculated in (c) and (d) in downhole memory.

18. The method of claim 12, further comprising:
(e) transmitting selected ones of the harmonic representations calculated in (c) and (d) to the surface.

19. A downhole measurement tool comprising:
a tool body having a longitudinal axis;
at least one transmitting antenna deployed about the tool body;
at least one receiving antenna deployed about the tool body, the receiving antenna being axially spaced from the transmitting antenna; and
a controller configured to (i) cause the tool to acquire a plurality of data pairs while rotating in a subterranean borehole, each data pair comprising a directional resistivity measurement and a corresponding azimuth angle; and (ii) process downhole a summation of the data pairs acquired in (i) to calculate a first order harmonic representation at a plurality of selected azimuth angles.

20. The measurement tool of claim 19, wherein the controller is further configured to (iii) repeat (i) and (ii); and (iv) assign a first measured depth value to the first order harmonic representations calculated in (ii) and a second measured depth value to the first order harmonic representations calculated in (iii).

21. The measurement tool of claim 19, wherein the controller is further configured to perform at least one of the following steps:
(iii) store the first order harmonic representations calculated in (ii) in downhole memory; and
(iv) transmit selected ones of the first order harmonic representations calculated in (ii) to the surface.

22. The downhole tool of claim 19, wherein the receiving antenna comprises a tilted antenna or a transverse antenna.

23. The downhole tool of claim 19, wherein the transmitting antenna comprises an axial antenna.

24. The downhole tool of claim 19, wherein at least one of the transmitting antenna and the receiving antenna comprises a non-planar antenna.

* * * * *